United States Patent [19]
Laurent

[11] 3,830,989
[45] Aug. 20, 1974

[54] COMPOSITE CONDUCTOR FOR SLIDING CURRENT COLLECTORS

[75] Inventor: Daniel Laurent, Grenoble, France
[73] Assignee: Merlin Gerin, Grenoble, France
[22] Filed: Feb. 2, 1973
[21] Appl. No.: 329,050

[30] Foreign Application Priority Data
Feb. 10, 1972  France ............................... 72.4590

[52] U.S. Cl. ...................... 191/29 DM, 191/22 DM
[51] Int. Cl. ............................................ B60m 1/34
[58] Field of Search ................. 191/22 DM, 29 DM

[56] References Cited
UNITED STATES PATENTS
1,620,496   3/1927   Spieckermann ............... 191/29 DM Primary Examiner—M. Henson Wood, Jr.
Assistant Examiner—D. W. Keen
Attorney, Agent, or Firm—Stevens, Davis, Miller & Mosher

[57] ABSTRACT

Composite conductor for sliding contact with high speed contact shoes. The conductor comprises a metal rail of high electrical conductivity including a generally dihedral end face and a V-shaped metal contact strip of low friction wear proof material having a poorer electrical conductivity. The contact strip engages the coextensive dihedral end surface which has lateral end flanges bent over the edges of the strip so as to grip the strip and hold the latter firmly against the rail along the whole length thereof.

8 Claims, 3 Drawing Figures

COMPOSITE CONDUCTOR FOR SLIDING CURRENT COLLECTORS

This invention relates to electrical distribution systems having sliding contact shoes which collect current from a conductor rail and, more particularly, relates to a composite conductor rail for use with such high speed contact shoes.

A known composite conductor comprises a conductor rail of high electrical conductivity, such as an aluminum bar, having a dihedral end face which is capped by a stainless steel sheet of W-shaped cross-sectional configuration. The outer legs of the sheet are spot welded to the lateral side faces of the bar. The main function of the bar is to conduct the current and to provide mechanical strength to the assembly whereas the steel cap provides a hard, low friction contact surface which is corrosion free and resists to the wear caused by the contact shoes moving at high speed past the composite conductor. The width of the W-shaped sheet is substantially greater than the width of the useful contact surface and this large dimensioning of the cap may cause buckling of the sheet due to thermal differential movements. To cope with this tendancy to warp, manufacturers have been led to increase the thickness of the cap causing a corresponding increase of the cost price.

It is an object of the invention to provide a novel composite conductor of more simple and less expensive construction than the prior art assembly.

It is another object of the invention to provide a novel composite conductor completely free from deformation under varying temperature conditions.

Another object of the invention is to provide an improved method of manufacture of a composite conductor dispensing with welding operations.

Generally, a composite conductor according to the invention comprises a V-shaped contact strip hold against the dihedral surface of the bar by lateral end flanges of the bar bent over the edges of the strip along the entire length thereof.

In accordance with another object of the invention, a method of manufacture of the composite conductor comprises the novel step of bending lateral flanges of the bar over the edges of the strip which has a general V-shaped cross-sectional configuration. Preferably, the edges of the strip are mechanically pretreated in order to provide a non-straight shape providing a better gripping relation with the overbent flanges.

These and other objects and features will become apparent from the following description of an embodiment of the invention shown in the annexed drawing, in which.

Figure 1:
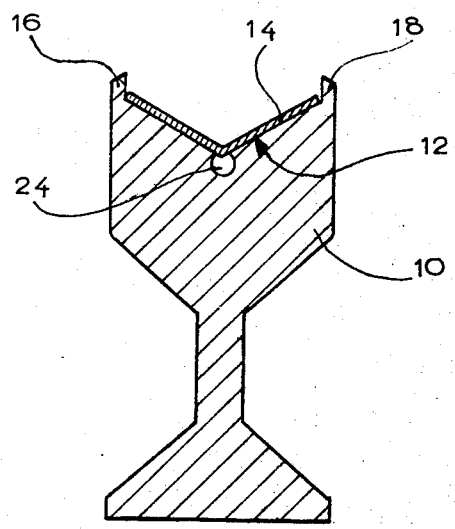
FIG. 1 is a cross-sectional view of a composite conductor according to the invention shown in an intermediate state of the manufacture process thereof, before folding down of the flanges.
Figure 3:
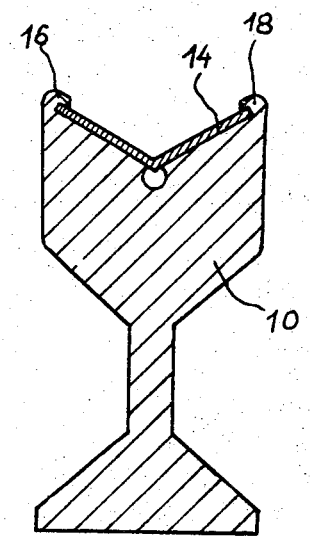
Figure 2:
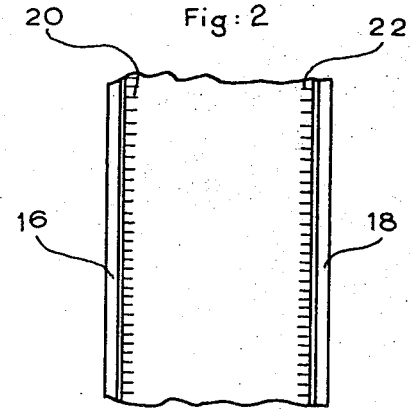
FIG. 2 is a plan view of the dihedral end face of the conductor.

FIG. 3 corresponds to FIG. 1 but shows the conductor after bending of the flanges.

Referring to the FIGURES, there is shown a composite conductor having a main body constituted by a bar or rail 10 of high electrical conductivity, such as an extruded aluminum bar, having a generally dihedrally shaped end face 12 accomodating a cross-sectionally generally V-shaped metal contact strip 14 of low friction wearproof material, such as a stainless steel strip, which engages the end face 12 in good electrical contact relationship therewith. The concave outer surface of the strip is adapted for sliding contact with longitudinally moving contact shoes (not shown) carried by a current collecting head (not shown). Generally, a number of bars 10 are longitudinally aligned and connected end-to-end and, correspondingly, a number, which may be different, of longitudinally aligned and abutting strips 12 is inserted to provide a continuous exposed contact surface for the contact shoes.

According to the invention, the edges 20, 22 of the strips 12 are laterally bordered, preferably with a small clearance, by peripheral longitudinal flanges 16, 18 of relatively small height which are initially upstanding, as shown in FIG. 1, and eventually inwardly folded down or bent over the edges 20, 22 after the insertion of the strip between the flanges. Preferably, the edges 20, 22 of the strip 14 are mechanically pretreated along a width corresponding roughly to the overlapping part of the flanges 16, 18 in folded down condition so as to improve the gripping relation between the edges and the folded flanges. This preliminar treatment may comprise such steps as deforming, roughening, cutting or punching and the like, destroying the straight-line initial shape of the edges to improve the adherence with the inner sides of the flanges. Preferably, the edges are knurled, for instance by serrated or embossed rollers, so that the protruding parts of the resulting corrugated shape of the edges may bite into said inner sides thereby preventing longitudinal movements of the strip 14 with respect to the bar 10.

The dihedral angle of the surface 12 and of the strip 14 may be about 120° and the central portion of the bar at the virtual meeting point of the planes of the dihedral surface 12 is preferably hollowed or sloped out as shown at 24 to cope with small imperfections of the central inner part of the strip 14.

The V-shaped strip 14 may be obtained from a flat sheet by roll forming, whereby the corrugations of the edges 20, 22 may also be obtained by rollers of suitable design. The finished strips 14 are progressively inserted between the still upstanding flanges 16, 18 against the front surface 12 of the bars 10 as the extrusion of the bars proceeds or may be effected on bars coming from a stock whereby the final manufacturing operation comprises a folding down or bending of the flanges 16, 18 over the edges 20, 22. This bending may also be effected by roller means.

It will be noted that the strips 14 have a width corresponding roughly to the useful portion thereof whereas the thickness of the strip may be very small due to the advantageous mounting arrangement extending along the whole length of the strips in accordance with the invention. The framing of the strips 14 by the lateral gripping flanges has cleared the exposed side faces of the conductor rail so as to make easier the mounting of guiding and supporting assemblies.

The strip 14 may be composite itself so as to have a mean thermal expansion which is intermediate between the thermal expansion of the aluminum of the bar and the stainless steel of the strip. A bimetallic strip may be used having a stainless steel exposed sheet bonded to an inner aluminum sheet. Such an arrangement permits to set down corrosion and thermal stresses and improves the electrical contact.

What is claimed is:

1. A composite conductor adapted for sliding contact relation with movable current collecting contact shoes, comprising:
   metal rail means of high electrical conductivity defining a generally dihedral, longitudinally extending concave face; and
   cross-sectionally V-shaped metal contact strip means of low friction wearproof material engaging said concave face substantially coextensively;
   said rail means including a pair of longitudinally extending gripping flanges bordering said concave face laterally and bent over the marginal side portions of said strip means so as to frame said strip means longitudinally securing thereby said strip means firmly to said rail means.

2. A conductor according to claim 1, said marginal side portions being mechanically deformed to enhance the gripping action of said flanges on said side portions.

3. A conductor according to claim 2, said side portions being knurled.

4. A conductor according to claim 1, the central portion of said concave face being hollowed out.

5. A conductor according to claim 1, the dihedral angle of said concave face and of said strip means being about 120°.

6. A conductor according to claim 1, said strip means being composed of longitudinally aligned abutting double layer strips.

7. A conductor according to claim 6, each strip comprising an outer sheet of stainless steel covering an inner sheet of aluminum.

8. A composite conductor comprising:
   a rail of extruded aluminum defining a longitudinally extending generally dihedral face laterally bordered by a pair of framing portions; and
   a stainless steel dihedral contact strip covering at least a longitudinal portion of said face coextensively and framed by said framing portions gripping the longitudinal edges of said strip.

* * * * *